W. H. HOLCOMB.
LAND MARKER.
APPLICATION FILED FEB. 29, 1916. RENEWED FEB. 14, 1918.
1,279,544.
Patented Sept. 24, 1918.
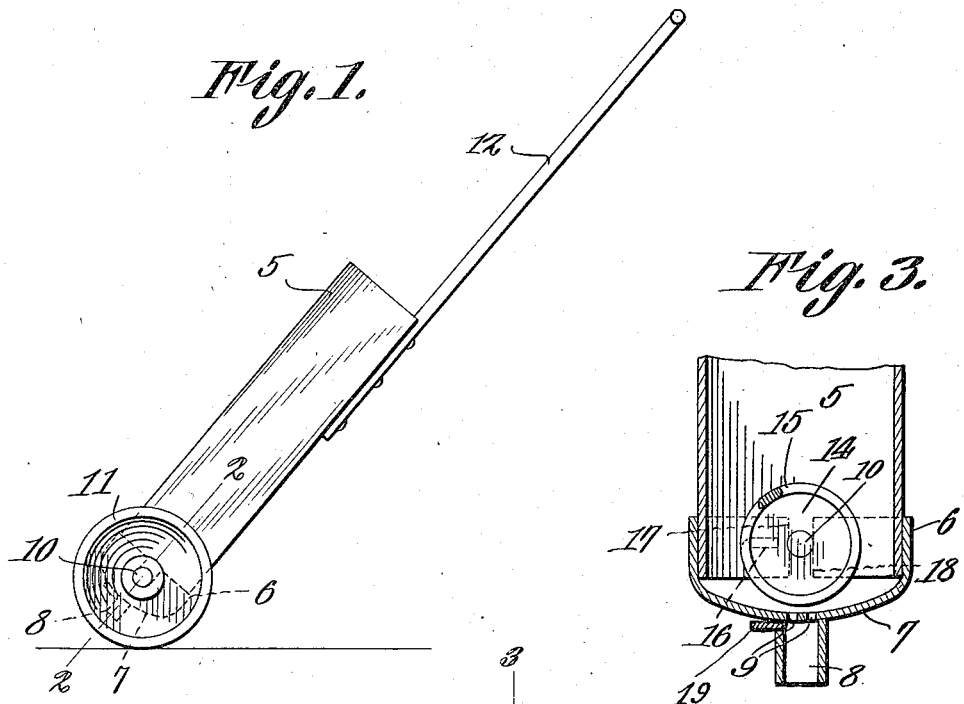
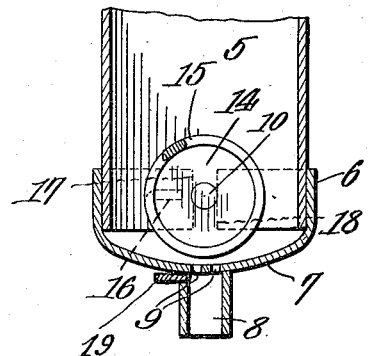
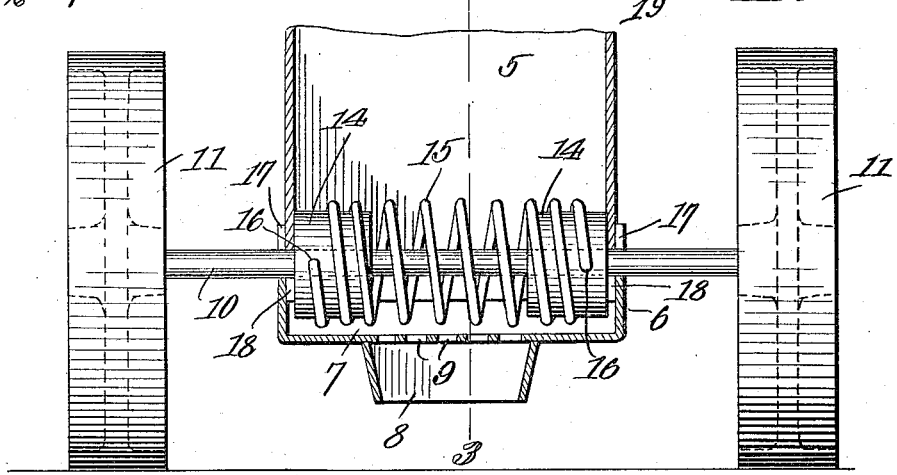
Wm. H. Holcomb, Inventor

UNITED STATES PATENT OFFICE.

WILLIAM H. HOLCOMB, OF CHICAGO, ILLINOIS, ASSIGNOR TO J. HUNTER SMITH, OF CHICAGO, ILLINOIS.

LAND-MARKER.

1,279,544.            Specification of Letters Patent.     Patented Sept. 24, 1918.

Application filed February 29, 1916, Serial No. 81,139. Renewed February 14, 1918. Serial No. 217,223.

*To all whom it may concern:*

Be it known that I, WILLIAM H. HOLCOMB, a citizen of the United States, residing at Chicago, in the county of Cook and State of Illinois, have invented new and useful Improvements in Land-Markers, of which the following is a specification.

This invention relates to devices for marking out baseball diamonds, tennis and croquet lawns, and the like, and its object is to provide a simple and easily operated device of this kind, the same consisting in a novel combination and arrangement of parts to be hereinafter described and claimed.

In order that the invention may be better understood, reference is had to the accompanying drawing in which—

Figure 1 is a side elevation of the device;

Fig. 2 is a front elevation partly broken away and in section, and

Fig. 3 is a vertical section on the line 3—3 of Fig. 2.

In carrying out the invention there is provided a receptacle 5 designed to hold the supply of powdered chalk or other substance employed for making the marks or lines on the ground. The receptacle is mounted at one end on a pair of wheels 11, and has attached to its other end a handle 12 whereby it may be conveniently propelled over the ground to be marked.

The bottom 7 of the receptacle is bowed crosswise, as shown in Fig. 2, and has outlet perforations 9 at the center, with a discharge spout 8 leading from said perforated portion.

The axle 10 carrying the wheels 11 extends through the bottom portion of the receptacle, being journaled in the side walls thereof. The wheels are fast on the axle, and the latter is therefore free to turn in order that it may operate an agitator to assure a constant flow of the marking material.

The agitator is a wire 15 encircling in spiral form that portion of the axle 10 which passes through the receptacle 5. The ends of the wire are fixed, as indicated at 16, to collars 14 fastened in laterally spaced relation on the axle, inside the receptacle, the diameter of the collars corresponding to the inside diameter of the spiral, and the latter fitting at its ends over the collars. The agitator turns with the axle and works close to the outlet perforations 9.

The bottom portion of the receptacle 5 is preferably separate from the remaining portion, and the adjacent ends thereof have notches to form the bearings for the axle 10, the notches 17 of the bottom portion and the notches 18 of the other portion of the receptacle each forming a half of the bearing as shown in Fig. 3. This structure enables the axle and the agitator structure to be readily assembled, after which the parts are soldered or otherwise connected to render the receptacle as rigid as if it were made in one piece.

The device is operated by being rolled over the ground, whereupon the marking substance issues from the perforations 9 and is discharged through the spout 8 onto the ground, the spout being dimensioned so that the marking substance is discharged in a thin stream of the proper width for the mark. The spout 8 is provided with a slide 19 serving to cut off or regulate the flow of material from the spout. The receptacle 5 is open at the top for filling.

I claim:—

A ground marker comprising a receptacle for the marking material having an outlet at one end, an axle passing through said end and journaled in the side walls of the receptacle, laterally spaced collars fixed on the axle inside the receptacle, and a spiral agitator fitting at its ends over the collars, and fastened thereto, and extending across the space between the collars.

In testimony whereof I affix my signature.

WILLIAM H. HOLCOMB.

Copies of this patent may be obtained for five cents each, by addressing the "Commissioner of Patents, Washington, D. C."